May 21, 1940.    C. C. KITTERMAN    2,201,141
VEHICLE AND TRAILER DRAFT DEVICE
Filed Nov. 10, 1939    2 Sheets-Sheet 1
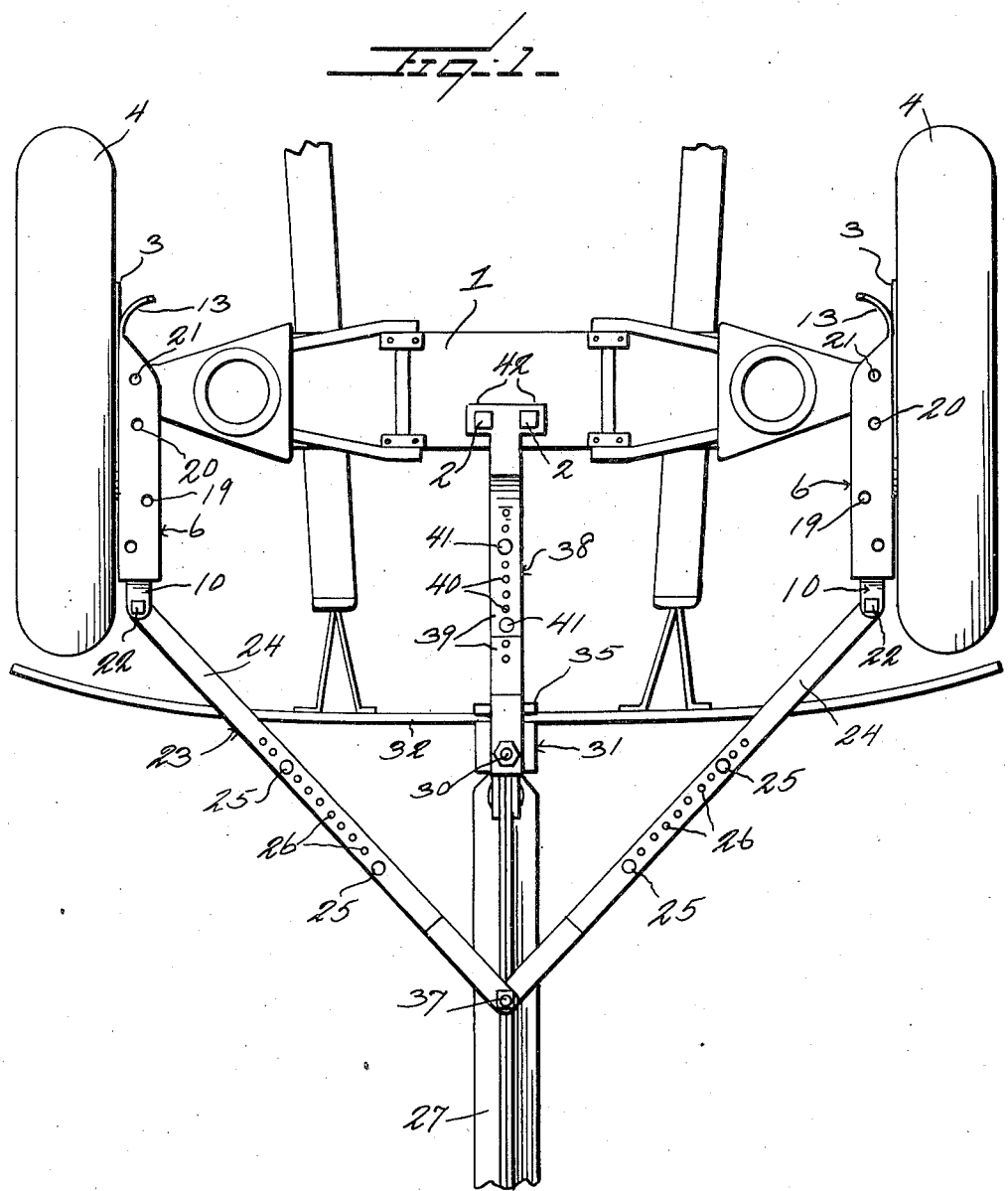
Inventor
C. C. Kitterman
By Watson E. Coleman
Attorney

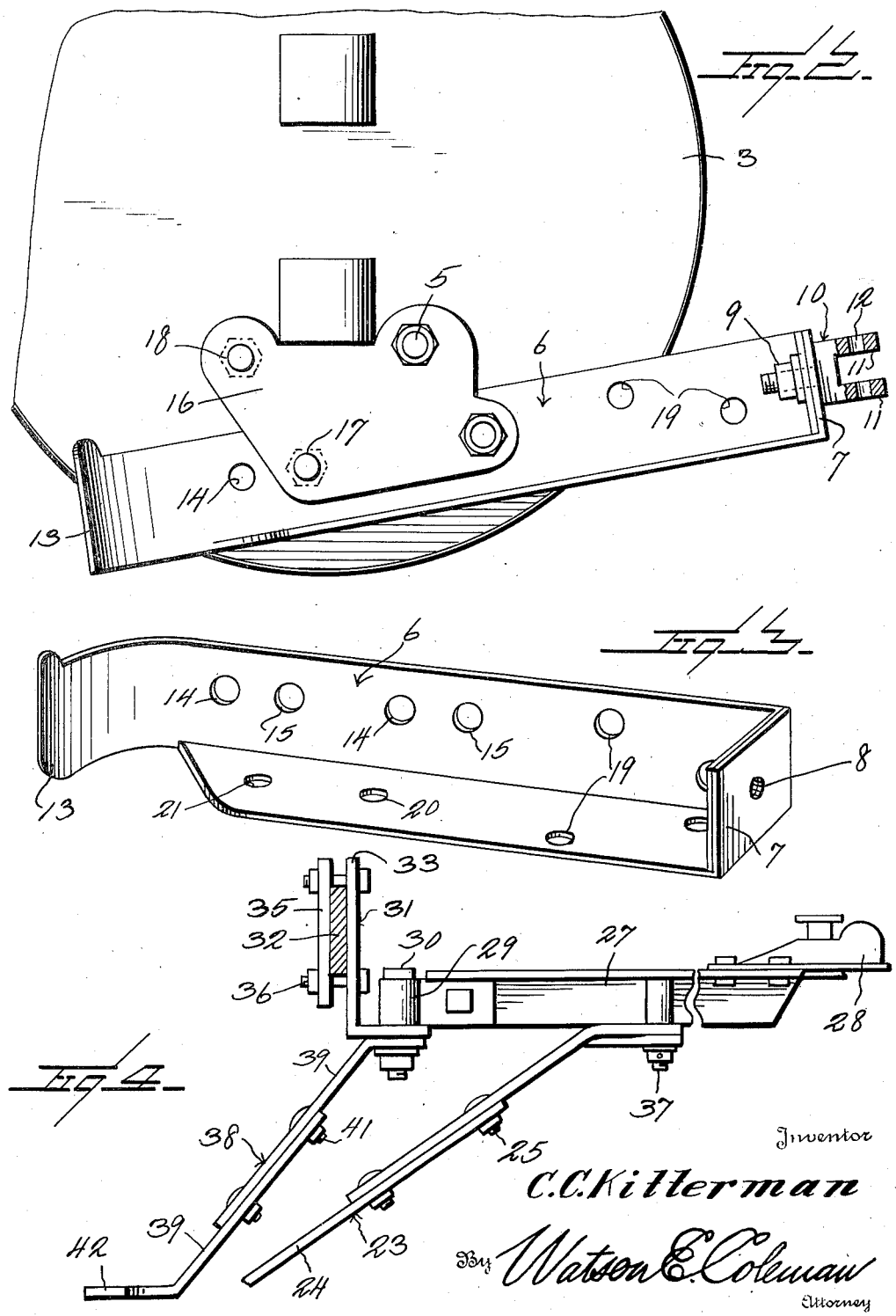

Patented May 21, 1940

2,201,141

UNITED STATES PATENT OFFICE 2,201,141

VEHICLE AND TRAILER DRAFT DEVICE

Carl C. Kitterman, Albia, Iowa

Application November 10, 1939, Serial No. 303,889

6 Claims. (Cl. 280—33.55)

This invention relates to draft devices and pertains particularly to an improved draft coupling designed for attaching motor vehicles or four-wheel trailers to a draft machine.

The present invention has for its primary object to provide a novel and improved draft device or coupling which is so designed that it may be readily attached to automobiles of any make or model so that a satisfactory steering connection may be made with the front wheels of such automobile or four-wheel trailer to cause the towed vehicle to accurately trail the draft vehicle.

Another object of the invention is to provide in a steering draft connection of the character stated, a novel form of adapter plate designed for connection with the front wheel brake drum flange or plate of the towed vehicle or with adjacent parts of the steering mechanism of such vehicle regardless of the make or model of such vehicle so that one style only of the complete device need be manufactured which may be readily applied to any car or trailer.

A further object of the invention is to provide in a trailer hitch structure of the character stated, a novel construction wherein the strain of pull applied to the towed vehicle is distributed to be applied to the central part of the axle and to the ends thereof adjacent the wheels of the vehicle so that the steering connections between the towing device and the towed vehicle wheels may function freely for guiding the vehicle wheels.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in bottom plan of the hitch mechanism embodying the present invention, showing the same applied to the front end of a vehicle.

Fig. 2 is a view illustrating in side elevation the application of the adapter unit to the front wheel brake drum flange or plate of the vehicle.

Fig. 3 is a view in perspective of the adapter with the portion of the same removed to facilitate a mounting different from that shown in Fig. 2.

Fig. 4 is a view in side elevation of the hitch mechanism minus the adapters.

Referring now more particularly to the drawings, an illustration and explanation is given of only one application of the adapter units of the present invention to a towed motor vehicle although the adapter units are designed so that by making certain changes in the same or adjustments of the position of the same with respect to the towed vehicles, they may be readily applied to vehicles of substantially all makes and all models of such makes.

The invention is illustrated as being applied to the front end of a motor vehicle having a knee action connection between the front wheels and the vehicle cross frame or axle beam, this illustration representing more or less diagrammatically the front end construction of portions of a Chevrolet motor vehicle.

In the specific type of vehicle referred to, the numeral 1 designates the front cross beam of the vehicle frame. Such vehicles have a pair of bolts 2 extending downwardly from the beam 1 which are employed as hereinafter described for connecting a certain portion of the present device to the towed vehicle.

The numeral 3 designates the brake drum flange or plate adjacent each of the wheels 4, which is connected with the steering parts of the vehicle and with the springs which are attached to the ends of the cross beam 1. In the type of motor vehicle under consideration as well as in other vehicles of a late model which have a front spring suspension, such as the vehicles known as Pontiac and Oldsmobile, the brake drum flange has a pair of bolts 5 which are employed as hereinafter stated for the connection of the adapter portion of the invention to the drum flanges so that the turning or steering of the wheels may be easily accomplished.

The device embodying the present invention includes two adapter units each of which is designed for connection with the vehicle brake drum flange or plate and each of these units is generally indicated by the numeral 6. Each of the adapter units comprises a bar of angle iron material which at its forward end is longitudinally split in the angle so that a portion of each of the angularly related parts is obtained which may be turned in into overlapping relation, these parts constituting ears 7 which have apertures 8, which are brought into register when the ears are welded or otherwise joined together. Through the registering apertures 8 is extended a pivot bolt 9 which connects to the adapter at its forward end, the yoke 10 having two spaced side portions 11, each of which has formed therethrough a bolt aperture 12.

The adapter bar at its rear end has one of the side portions thereof extended longitudinally beyond the other and longitudinally curved to form a substantially hook-shaped terminal 13. The side flange or flange portion of the adapter bar 6 from which the curved end 13 extends, is provided with two longitudinally spaced apertures 14 adjacent the free longitudinal edge of the flange and adjacent these apertures are apertures 15 for the purpose about to be stated.

To the inner side of the flange of the bar 6 through which the apertures 14 and 15 are formed, there is secured a removable elongated plate 16 which is disposed longitudinally of the bar and has adjacent one longitudinal edge suitable apertures for registry with the apertures 15, to receive bolts 17 by which the plate 16 is secured to the bar. At the opposite longitudinal edge or top edge of the plate 16 there are formed apertures 18 which are arranged so as to receive the bolts 5 which are carried by the drum plate 3. When the adapter bar plate 16 is secured by the bolts 5 against the inner side of the wheel drum plate, the bar 6 will extend horizontally forwardly, the curved rear end portion 13 lying rearwardly of the steering connection between the beam 1 and the wheel. The other flange of the bar 6 from the one to which the plate 16 is attached, is horizontally disposed.

Adjacent the forward end of each bar 6, each of the two flanges of the bar has formed therethrough a longitudinally spaced pair of apertures 19, the use of which will be hereinafter described. The flange 6 of each bar which for ease of identification might be referred to as the horizontal flange to distinguish it from the other flange which is vertically arranged, has therethrough apertures 20 and 21, the uses of which apertures will be hereinafter stated.

When the adapters are attached to the wheel drum plates 3 in the manner illustrated, the swivel yokes 19 will extend forwardly with respect to the machine. Each of these yokes has connected therewith by means of a pivot bolt 22, an end of a jointed or two-part steering rod 23. The two parts 24 of each steering rod are joined together by bolts 25 which are passed through alined apertures 26 in the rods, each of the rods having a number of such apertures 26, thus making it possible to adjust the length of each steering rod to suit the particular car upon which the device is used.

The numeral 27 designates the draft or pull bar which at its forward end carries the socket portion 28 of a ball and socket connection of standard design. At its rear end this pull bar 27 carries a pivot bolt sleeve 29 which is vertically arranged when the bar is in operative position, for the reception of a pivot bolt 30. Joined to the sleeve 29 by means of the pivot bolt 30 is a bumper clamp indicated generally by the numeral 31 by means of which the pull bar 27 is coupled with the bumper 32 of the towed vehicle. This bumper clamp consists of the elongated plate 33 which at its lower end is right angularly turned, as indicated at 34, and has a suitable aperture for the reception of the bolt 30, and a shorter plate 35 which is disposed in parallel relation with the plate 33 and is secured thereto by bolts 36. The bumper 32 passes between the plates 33 and 35 and when the bolts 36 are tightened, the bumper will be firmly clamped to the rear end of the pull bar 27.

The pull bar 27 carries, forwardly of the pivot bolt 30, a downwardly directed bolt 37 to which are pivotally connected the outer ends of the steering rods 23. Thus it will be seen that these rods 23 converge at the longitudinal center of the machine and extend laterally from the converging point to the adapter units or bars 6 to which they are pivotally connected.

The numeral 38 generally designates a connector bar which couples the pull bar 27 with the transverse frame beam 1. This connector bar 38 is in the two portions 39, each of which is provided with a series of apertures 40 for the reception of one or more bolts 41 whereby the effective length of the bar 38 may be changed according to the type of car on which the draft device is connected. The forward end of the connector bar 38 is attached to the pull bar 27 by means of the bolt 30, as shown. At its rear end the connector bar has a cross head 42 which is provided with suitable apertures for the reception of the bolts 2 which are carried by the frame of the cross beam 1.

From the foregoing, it will be readily apparent that when the hitch device of the present invention is attached to the front end of a motor vehicle or a four-wheel trailer with the adapter units or bars 6 coupled with the front wheel brake drum flanges or plates or adjacent parts of the steering mechanism for transmitting turning movement to the wheels, the desired oscillation or turning of the wheels is effected in accordance with the movement of the pulling or draft car through the medium of the draft bar 27. The rear end of this bar fulcrums on the pivot bolt 30 and transmits the desired thrust to the outer end of one adapter bar 6 through the medium of the adjacent steering bar 23 and a pull on the outer end of the other adapter bar through the medium of the adjacent steering bar 23. Because of the connection of the rear end of the pull bar 27 with the vehicle bumper 32 by the clamp 31 and with the front cross bar 1 of the frame by means of the connector bar 38, the pulling strain will be applied to fixed parts of the machine which are independent of the steering mechanism and, therefore, no pulling strain will be placed on the front wheels of the towed vehicle or upon the steering connections between the two front wheels and the pull bar 27. This permits the steering operation to be carried out freely and without danger of straining or breaking any of the steering parts.

It has previously been stated that by the use of the plate 16 upon each of the adapter unit bars 6, these adapters may be readily applied to motor vehicles such as Chevrolet, Pontiac and Oldsmobile, which have knee action front wheels. By removing the plate 16, the adapters may be readily applied to Chevrolet cars of a model earlier than those models having front spring suspension such as is here illustrated, by securing the attaching bolts of the brake flanges in the apertures 14. The apertures or bolt holes 21 fasten in exactly the same manner to the brake drums of cars of the Plymouth and Dodge type and of the 1933 to 1939 models whether the same are with or without axles. The aperture 20 is used alone to adapt the bar to all cars of the Ford V-8 type dating from 1932 to 1940, inclusive. When using the device upon Ford cars of the 1938-39 and 40 models, the hook or curved rear end 13 of each adapter bar fits underneath the bottom of the spindle and is employed to steady the device. The apertures 19 of either of the two flanges of the bar 6 facilitate attachment of the bar at the extreme front end to the knees of the Chevrolet and Pontiac cars dating from 1934-38 which have knees.

From the foregoing, it will be readily apparent that by the provision of the adapter bars of the character described and with the various groups of apertures set forth, the draft device may be readily applied to a large number of cars of different makes and models, there being only one part which must be removed from the adapters and put aside when the device is used on certain types of cars, this being the plate 16 of each bar. The mechanism embodying this invention gives a strong positive means of attaching a draft vehicle to a drawn vehicle in such a way that the drawn vehicle may be accurately steered with the draft vehicle and danger of breakage of the steering parts due to pulling or towing strain is completely eliminated through the provision of the direct coupling between the pull bar and the cross front beam of the drawn machine.

What is claimed is:

1. A draft connection for attachment to the front end of a vehicle having front steering wheels and brake drum plates associated therewith, comprising a pull bar, means pivotally attached to one end of said pull bar for coupling the said end to a fixed part of the vehicle substantially midway between said wheels, a pair of steering bars each pivotally attached to said pull bar in advance of said pivotal connection, said steering bars extending rearwardly and laterally in diverging relation, and means for pivotally coupling the rear end of each steering bar with a wheel brake drum plate, comprising an elongated apertured bar member designed to position against the inner side of the drum plate and to receive in an aperture a bolt of the drum plate, each of said last bars having a swivel connection at one end to which the adjacent end of the steering bar is connected.

2. A draft connection for attachment to the front end of a vehicle having front steering wheels and brake drum plates associated therewith, comprising a pull bar, means pivotally attached to one end of said pull bar for coupling the said end to a fixed part of the vehicle substantially midway between said wheels, a pair of steering bars each pivotally attached to said pull bar in advance of said pivotal connection, said steering bars extending rearwardly and laterally in diverging relation, means for pivotally coupling the rear end of each steering bar with a wheel brake drum plate, comprising an elongated apertured bar member designed to position against the inner side of the drum plate and to receive in an aperture a bolt of the drum plate, each of said last bars having a swivel connection at one end to which the adjacent end of the steering bar is connected, and means forming a part of each of said apertured bars at its rear end for connection with the steering spindle of the adjacent wheel to maintain the apertured bar in operative position.

3. A draft coupling for a wheeled vehicle having front steering wheels and brake drum plates, a frame cross beam, and a bumper, comprising a pull bar, means for pivotally attaching the pull bar at one end to said bumper, a second bar connected with said pull bar at said pivotal connection and extending rearwardly to said frame cross beam, means for connecting said second bar with said beam, and linkage mechanism pivotally coupling said pull bar from a point forwardly of the pivotally supported end thereof with each of said wheel drum plates which is so constructed and arranged that upon lateral oscillation of the pull bar on its pivotal support swinging steering movement will be imparted to said wheels.

4. A draft device for a wheeled vehicle having front steering wheels, a brake drum plate associated with each wheel, a frame cross beam and a member extending transversely of the beam in front of the same, comprising a pull bar, a clamp for attachment to said member, a pivotal supporting connection between an end of the pull bar and said clamp, a connector bar between said pull bar at the said pivotal support therefor and said beam whereby pulling strain will be carried by the beam, a pair of adapter members each comprising an elongated apertured bar, certain of the apertures of each of said bars being arranged to receive bolts carried by said drum plates whereby the apertured bars may be securely attached to the drum plates to extend forwardly therefrom, a pair of steering bars each attached at one end to said pull bar for turning movement on a common center, and a swiveled coupling between the other end of each steering bar and the forward end of one of said adapter bars.

5. A draft device for a wheeled vehicle having front steering wheels, a brake drum plate associated with each wheel, a frame cross beam and a member extending transversely of the beam in front of the same, comprising a pull bar, a clamp for attachment to said member, a pivotal supporting connection between an end of the pull bar and said clamp, a connector bar between said pull bar at the said pivotal support therefor and said beam whereby pulling strain will be carried by the beam, a pair of adapter members each comprising an elongated apertured bar, certain of the apertures of each of said bars being arranged to receive bolts carried by said drum plates whereby the apertured bars may be securely attached to the drum plates to extend forwardly therefrom, a pair of steering bars each attached at one end to said pull bar for turning movement on a common center, and a swiveled coupling between the other end of each steering bar and the forward end of one of said adapter bars, said connector bar and the said steering bars each being in two sections joined together to facilitate changing the lengths thereof.

6. A draft mechanism for a wheeled vehicle having front steering wheels and having bolt carried drum plates associated with the wheels and a frame cross beam and bumper, comprising a pull bar, a clamp adapted for connection with said bumper and including a terminal angularly directed portion on which an end of the pull bar rests, means for pivotally coupling the said end of the pull bar with said terminal portion, a connector bar pivotally attached at one end to said means and adapted to have its other end attached to said frame cross beam, a pivot bolt carried by the pull bar in advance of the pivoted end thereof, a pair of steering bars each having an end pivotally connected with said pivot bolt, an adapter for each drum plate, comprising a bar of angle material, the said adapter bars having a plurality of apertures for selective connection with the drum plate carried bolts of vehicle wheels, a coupling yoke pivotally attached to one end of each adapter bar, and means pivotally securing the other end of each steering bar with a coupling yoke.

CARL C. KITTERMAN.